Oct. 21, 1952     J. H. HIRSCH     2,614,915
MANUFACTURE OF SYNTHESIS GAS
Filed Nov. 24, 1947
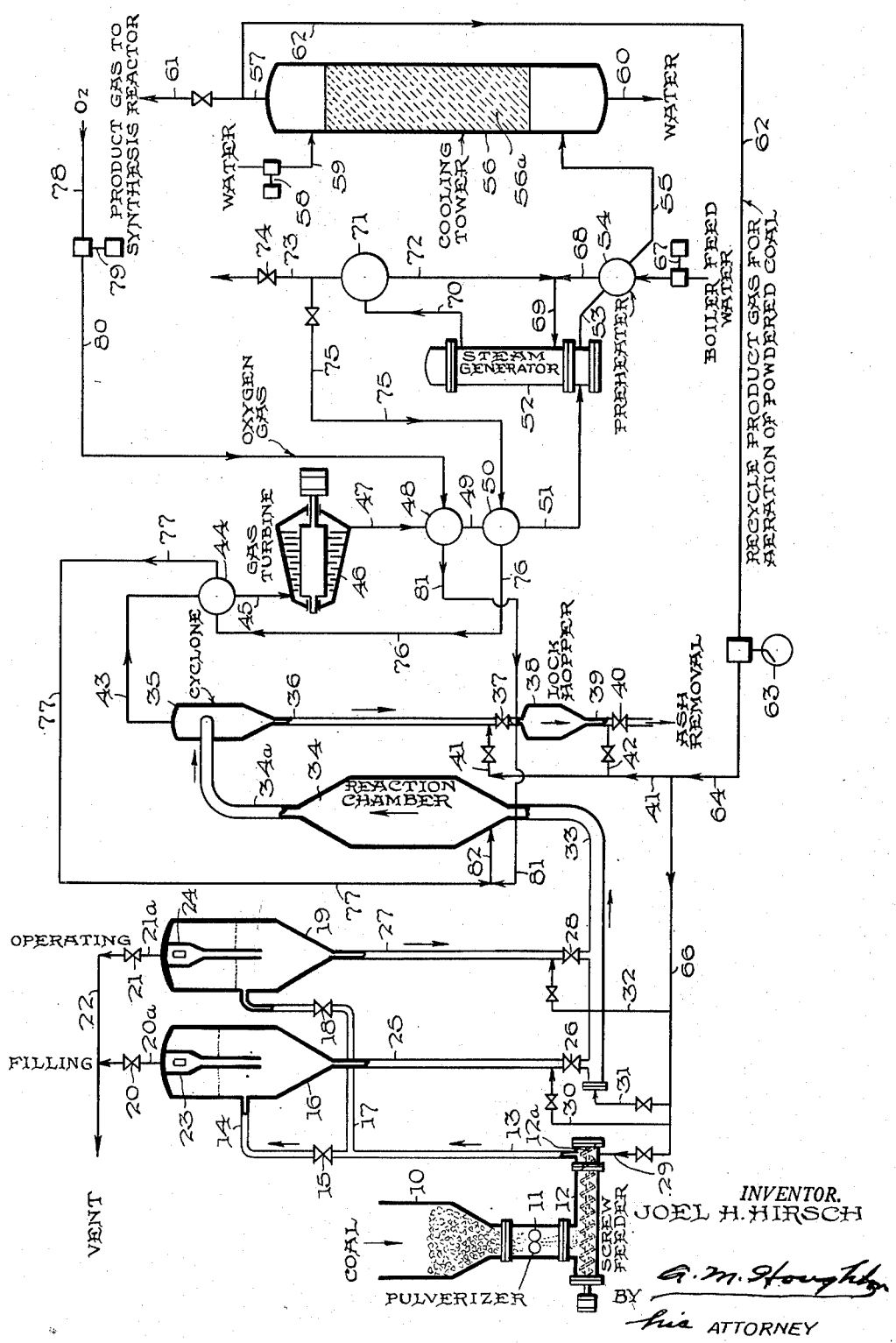
INVENTOR.
JOEL H. HIRSCH
BY G. M. Houghton
his ATTORNEY Patented Oct. 21, 1952

2,614,915

UNITED STATES PATENT OFFICE 2,614,915

MANUFACTURE OF SYNTHESIS GAS

Joel H. Hirsch, Oakmont, Pa., assignor to Gulf Research & Development Company, Pittsburgh, Pa., a corporation of Delaware Application November 24, 1947, Serial No. 787,829

3 Claims. (Cl. 48—203)

This invention relates to the manufacture of synthesis gas, useful for the synthesis of hydrocarbons by the so-called Fischer-Tropsch process. More particularly, it relates to the manufacture of a synthesis gas mixture of hydrogen and carbon monoxide from finely divided coal.

In accordance with my invention, snythesis gas, comprising essentially a mixture of hydrogen and carbon monoxide, is obtained from finely divided coal, steam and oxygen by a process in which a substantial proportion of the power requirements of the process, including the power necessary for the production of oxygen, are obtained from the process itself. More particularly, it has been found that when a coal to be converted into synthesis gas is finely divided, fluidized and reacted in a reaction zone with steam and oxygen under superatmospheric pressure, and the resulting synthesis gas is rapidly cooled by expanding it with the production of external work, there is not only obtained the desired synthesis gas, but a substantial proportion of the power needed for the process. Furthermore, aside from the production of power, the manufacture of synthesis gas in accordance with my invention permits of ease and flexibility of control of the reaction including the accurate proportioning of the coal, steam and oxygen required. Additionally, the synthesis gas is produced in a desired mol ratio of hydrogen to carbon monoxide, such as 2:1 or 3:1, substantially free of inert constituents, and it may be obtained at a temperature and pressure desired for the subsequent synthesis.

In accordance with my invention, the manufacture of synthesis gas may be represented stoichiometrically by the following reactions, depending upon the mol ratio of hydrogen to carbon monoxide desired.

$$3C + 4H_2O \rightarrow CO_2 + 4H_2 + 2CO \quad (1)$$

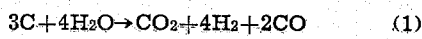

$$2C + 3H_2O \rightarrow CO_2 + 3H_2 + CO \quad (2)$$

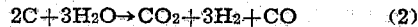

Since the above reactions are endothermic, sufficient oxygen and excess coal are added to result in the following reaction:

$$C + O_2 \rightarrow CO_2 \quad (3)$$

The latter exothermic reaction liberates sufficient heat to maintain the endothermic synthesis gas reactions. In this manner, synthesis gas may be produced continuously, thus avoiding the blast and run periods of the conventional water gas reaction. Since all of the reactants, that is, steam, oxygen and carbon in the form of fluidized coal may be employed in the stoichiometric proportions required, the manufacture of synthesis gas in accordance with my invention offers a greater operating flexibility than prior processes for producing synthesis gas, and the composition of the product synthesis gas can be closely controlled. This is in contrast with known water gas processes where the large excess of carbon limits the degree of control of the composition of the product gas.

As previously stated, synthesis gas may be obtained in varying mol ratios of hydrogen to carbon monoxide, such as 2:1 or 3:1. In order to obtain a mixture of hydrogen and carbon monoxide in a mol ratio of 2:1, the coal and steam are admitted to the reaction zone in substantially stoichiometric proportions, and sufficient excess coal and oxygen are added to maintain the reaction. Thus, for every 36 pounds of carbon utilized in the water gas reaction, about 72 pounds of steam are required to react therewith, plus 323 pounds of steam to provide the desired 2:1 equilibrium. Forty-seven pounds of excess carbon and 565 cubic feet of oxygen (measured at standard temperature and pressure) are required to provide the heat of reaction. Since the amount of carbon in coals of different rank will vary, the amounts of coal to be added will vary in proportion to the amount of carbon contained therein, as will be understood by those skilled in the art. Fluidization of the coal, results in substantially uniform reaction conditions throughout the reaction chamber, with the result that the reaction proceeds rapidly and uniformly. The temperature in the combustion chamber is preferably maintained in the range 2000° to 2500° F. Both the steam and the oxygen are preheated to a temperature sufficient to cause reaction with the fluidized coal upon contact therewith in the reaction chamber. The steam is preheated to a temperature of 1000° F., and the oxygen is preheated to a temperature of 1000° F.

It is a feature of my invention that the reaction to produce synthesis gas takes place under superatmospheric pressures. All of the reactants are introduced into the reaction chamber under superatmospheric pressure and the product synthesis gas is withdrawn from the reactor also under superatmospheric pressure. The synthesis gas is then expanded with the production of external work and is thereby rapidly cooled. The superatmospheric pressure under which the system is operated and the degree of expansion of the synthesis gas may be varied in accordance with the amount of power desired, but I prefer to operate the system under a pressure of about 300 pounds per square inch gauge and to expand the synthesis gas to a pressure of about 200 pounds per square inch gauge. In so doing, enough residual heat is left in the expanded synthesis gas to generate and superheat the steam required for the process, as well as to preheat the oxygen. Furthermore, the synthesis gas may then be obtained at suitable temperatures and pressures required for the subsequent hydrocarbon synthesis, such as a temperature of about 100° F., and a pressure of about 190 pounds per square inch gauge.

My invention will be more fully understood by reference to the attached drawing, wherein there is shown diagrammatically a system for the production of synthesis gas in accordance with my invention. Referring now to the drawing, coal is introduced in lumps into the hopper 10, whence it passes into pulverizer 11 where it is finely ground to a sufficient fineness to permit its suspension and fluidization in a stream of gas. Ordinarily a particle size of 50 to 200 mesh will be sufficient. From the pulverizer, the finely divided coal is fed by screw feeder 12 to an aerating zone 12a at the end of the screw feeder, where an aerating gas, such as recycled product synthesis gas entering the aerating zone from line 29, fluidizes the finely divided coal and transmits it upwardly through conduit 13, valve 15 and conduit 14 into hopper 16 under substantially atmospheric pressure. As shown in the drawing, two hoppers, 16 and 19, respectively, are provided. The purpose of the two hoppers is to provide a continuous supply of fluidized powdered coal to the reaction chamber 34. Accordingly, while hopper 16 is being filled through conduit 14, valve 18 in conduit 17 leading to filled hopper 19 is closed and the fluidized coal in hopper 19 is being discharged through standpipe 27 and slide valve 28 into riser line 33 leading to reaction chamber 34. The pressure in hopper 19 is slightly higher than that existing in the reaction chamber. Riser line 33 is provided with recycled product gas as an aerating gas through lines 31, 66 and 64. During the filling of hopper 16, slide valve 26 in standpipe 25 remains closed. After the hopper 16 has been filled to the requisite amount with fluidized powdered coal, the pulverizer and screw feeder are shut down and valve 15 is closed. Valve 20 in vent line 20a leading from hopper 16 into line 22 is throttled but not closed and the pressure in the hopper is raised to a pressure at least equal to that existing in the reaction chamber; i. e., about 300 p. s. i. g. This is accomplished by passing a portion of the recycled product gas from line 62 through compressor 63, where it is compressed to the desired pressure, and lines 64, 65 and 30 into the standpipe 25. The coal is also maintained in the fluidized state thereby. It is essential that the pressure in the hopper 16 be slightly greater than the pressure in the combustion chamber 34 in order that the fluidized coal may flow from the hopper 16 into the reaction chamber 34. Furthermore, the standpipe 25 is of such height as to provide a fluid pressure head at the bottom of the standpipe 25 sufficient to establish a pressure drop across the slide valve 26, i. e., the pressure at the bottom of the standpipe is greater than the pressure of the aerating gas in line 33. When slide valve 26 is opened, the fluidized powdered coal flows into the riser line 33 and is carried into reaction chamber 34 by means of the aerating gas entering line 33 through line 31. When the hopper 19 is almost empty, slide valve 26 is opened and the material in hopper 16 begins to flow into the reaction chamber. At this time, both hoppers 16 and 19 are discharging. When the hopper 19 is substantially completely discharged, slide valve 28 is closed, valve 21 in vent line 21a is opened, gradually reducing the pressure in hopper 19 to atmospheric, valve 18 in line 17 is opened, and the pulverizer 11 and screw feeder 12 are started again. In this manner, hopper 19 is again filled with fluidized powdered coal, while hopper 16 is discharging into the reaction chamber. After hopper 19 has been filled, valve 18 is closed, valve 21 is throttled and the pressure in the hopper 19 is increased to a pressure slightly greater than that in the reaction chamber by the admission of recycled product gas through line 32. When the hopper 16 is almost empty the cycle is repeated. Cyclone separators 23 and 24 are provided in the fluidized coal hoppers to recover whatever coal is carried up out of the fluidized bed in the hoppers during the filling operation. Normally, however, the fluidized bed of coal in the hoppers will trap most of the coal brought into the hoppers.

As stated, the fluidized coal passing from the hoppers through the slide valves into riser line 33 is carried along by a stream of recycled product gas into the reaction chamber 34. Preheated steam, which has been generated from the heat contained in the product gases as hereinafter described, is admitted to the reaction chamber through lines 77 and 82. Preheated oxygen is admitted to the reaction chamber through lines 81 and 82. In the reaction chamber, the reactants are converted to a synthesis gas mixture of carbon monoxide and hydrogen, the reactants and reaction products being present throughout the reaction chamber in proportions corresponding to the proportions in the mixture of reactants introduced into the reaction chamber. Carbon dioxide and ash from the coal are also formed. In order to remove the ash from the product gases, all reaction products flow upwardly through line 34a, enter cyclone separator 35, where the ash is separated, and pass through line 36 and valve 37 into lock hopper 38. When it is desired to empty hopper 38, valve 37 is closed, valve 40 is opened and the ash then flows through line 39 and valve 40 to any desired deposition. In order to avoid loss of pressure on the system, recycled product gas passing from the compressor 63 and line 64 under pressure is admitted to line 36 through line 41, and into line 39 through line 42.

The hot product gases, leaving the cyclone separator 35 through line 43 at a pressure of about 300 p. s. i. g., pass through heat exchanger 44 where they are cooled and give up a portion of their sensible heat to superheated steam passing through heat exchanger 44 by means of lines 76 and 77, thereby further heating the steam to the desired preheat temperature. The degree of cooling of the product gas in the heat exchanger 44 is such as to reduce its temperature to about 1200° F. for satisfactory operation in the gas turbine 46. The cooled product gases leave heat exchanger 44 through line 45 and enter gas turbine 46. In the gas turbine 46, the product gases are expanded with the production of external work to a pressure of about 200 p. s. i. g., and in this manner are rapidly cooled. Furthermore, in passing through the gas turbine, the product gases yield an appreciable proportion of the power requirements for the system.

From the gas turbine 46, the product gases are exhausted to line 47, heat exchanger 48, line 49, superheater exchanger 50 and line 51, whence they enter steam generator 52. In heat exchanger 48, oxygen arriving through line 80 is preheated to the desired preheat temperature and then is passed through lines 81 and 82 into the reaction chamber. In the superheater exchanger 50, steam coming from steam drum 71 and line 75 is superheated and then passed through line 76 to heat exchanger 44 where it is further heated, as set forth hereinabove.

The product gases entering steam generator 52 generate steam which passes into line 70 and steam drum 71. The product gases leaving the steam generator through line 53 pass through a preheater 54 wherein feed water, pumped into the preheater by pump 67, is preheated. The preheated feed water leaves the preheater through line 68, and, along with condensed water from the steam drum 71, flowing through line 72, enters the steam generator through line 69. Steam may be withdrawn from the steam drum 71 through line 73 controlled by valve 74.

The product gases issue from the feed water preheater 54 into line 55 and thence into the bottom of a cooling tower 56 provided with any suitable packing 56a, such as stoneware rings. Water is introduced into the top of the cooling tower by pump 58 and line 59 and serves the functions of (1) further cooling the product gases, and (2) since the product gases are still under pressure, of removing a substantial proportion of the carbon dioxide and water vapor therefrom. The wash water leaves the cooling tower through line 60, and the washed and cooled synthesis gas leaves the cooling tower through line 57 at a temperature of about 100° F., and a pressure of about 190 p. s. i. g. The product gas may then be passed to a synthesis reactor through line 61. A stream of product gas is taken off through line 62, whence it is recycled through compressor 63 and lines 64 and 66 to provide aerating gas and pressuring gas to lines 29, 30, 31, 32, 41 and 42 as previously described.

As shown, oxygen from an oxygen plant enters the system through line 78, is compressed in compressor 79 to the desired pressure, flows through line 80 to preheater 48 and thence to the combustion chamber, as hereinabove described. If a source of liquid oxygen is available, the compressor 79 may be replaced by a pump and followed by a vaporizer exchanger whereby gaseous oxygen may be produced at the required pressure.

While I have disclosed the use of two hoppers to supply fluidized coal continuously to the reaction chamber, it is within the scope of my invention to use more than two hoppers which are being discharged and filled in a cyclic or alternate sequence. Furthermore, in lieu of expanding the hot gaseous reaction products from a pressure of 300 p. s. i. g. to a pressure of 200 p. s. i. g., they may be expanded to a lower pressure, such as 100 p. s. i. g., or even to atmospheric pressure, depending upon the amount of power that is desired and the reaction pressure of the subsequent hydrocarbon synthesis. In some instances, it may be desirable to expand the gases to atmospheric pressure and recompress them to the pressure required in the subsequent hydrocarbon synthesis. Any of such variations are deemed to be within the scope of my invention.

I claim:

1. In a process for the production of a synthesis gas mixture of hydrogen and carbon monoxide wherein a finely divided coal is fluidized, continuously introduced into a reaction zone, reacted with steam and oxygen under superatmospheric pressure, and the hot gaseous reaction products are expanded with the production of external work, the steps which comprise fluidizing finely divided coal in a stream of recycled synthesis gas, passing said stream of fluidized coal into one of at least two storage zones maintained under substantially atmospheric pressure, interrupting the passage of said fluidized coal into said storage zone while maintaining the coal therein in fluidized condition, increasing the pressure in said storage zone to a superatmospheric pressure at least equal to that existing in the reaction zone, maintaining a vertical column of said fluidized coal below said storage zone and communicating therewith, said vertical column being of sufficient height to produce a fluid pressure head over the bottom of said column, opening the bottom of said vertical column to said reaction zone, conveying said fluidized coal from said storage zone through said column into said reaction zone by a stream of recycled synthesis gas, closing the bottom of said vertical column from said reaction zone when said storage zone is nearly empty, venting said storage zone until the pressure therein is substantially atmospheric and repeating said cycle while at least one other storage zone is being filled and emptied in an alternate sequence.

2. A process for the production of a synthesis gas mixture of hydrogen and carbon monoxide in a controlled ratio of hydrogen to carbon monoxide in a reaction zone under superatmospheric pressure and a reaction temperature which comprises fluidizing finely divided coal in a stream of recycled synthesis gas, passing said stream of fluidized coal into one of at least two storage zones maintained under substantially atmospheric pressure, interrupting the passage of said fluidized coal into said storage zone while maintaining the coal therein in a fluidized condition, increasing the pressure in said storage zone to a superatmospheric pressure at least equal to that existing in the reaction zone, maintaining a vertical column of said fluidized coal below said storage zone and communicating therewith, said vertical column being of sufficient height to produce a fluid pressure head over the bottom of said column, opening the bottom of said vertical column to said reaction zone, conveying said fluidized coal from said storage zone through said column into the lower portion of said reaction zone by a stream of recycled synthesis gas, closing the bottom of said vertical column from said reaction zone when said storage zone is nearly empty, venting said storage zone until the pressure therein is substantially atmospheric and repeating said cycle while at least one other storage zone is being filled and emptied in an alternate sequence, introducing into the lower portion of said reaction zone, amounts of oxygen and steam controlled to produce upon admixture with said coal fluidized in said stream of recycled synthesis gas, sufficient heat to maintain in said reaction zone said reaction temperature and to furnish stoichiometric amounts of the reactants to produce hydrogen and carbon monoxide in said controlled ratio, flowing the resulting mixture upwardly through said reaction zone, and withdrawing reaction products comprising hydrogen and carbon monoxide in said controlled ratio from the upper portion of said reaction zone.

3. In a process for the production of a synthesis gas mixture of hydrogen and carbon monoxide wherein a finely divided coal is fluidized, continuously introduced into a reaction zone, and reacted with steam and oxygen under superatmospheric pressure, the steps which comprise fluidizing finely divided coal in a stream of recycled synthesis gas, passing said stream of fluidized coal into one of at least two storage zones maintained under substantially atmospheric pressure, interrupting the passage of said fluidized coal into said storage zone while maintaining the coal therein in fluidized condition, increasing the pressure in said storage zone to a superatmospheric pressure at least equal to that existing in the reaction zone, maintaining a vertical column of said fluidized coal below said storage zone and communicating therewith, said vertical column being of sufficient height to produce a fluid pressure head over the bottom of said column, opening the bottom of said vertical column to said reaction zone, conveying said fluidized coal from said storage zone through said column into said reaction zone by a stream of recycled synthesis gas, closing the bottom of said vertical column from said reaction zone when said storage zone is nearly empty, venting said storage zone until the pressure therein is substantially atmospheric and repeating said cycle while at least one other storage zone is being filled and emptied in an alternate sequence.

JOEL H. HIRSCH.

REFERENCES CITED

The following references are of record in the file of this patent:

UNITED STATES PATENTS

| Number | Name | Date |
|---|---|---|
| 1,873,941 | Hillebrand | Aug. 23, 1932 |
| 1,924,856 | Heller | Aug. 29, 1933 |
| 2,111,579 | Winkler et al. | Mar. 22, 1938 |
| 2,222,489 | Riggs | Nov. 19, 1940 |
| 2,389,636 | Ramseyer | Nov. 27, 1945 |
| 2,432,135 | Barr | Dec. 9, 1947 |
| 2,488,969 | Dietler | Nov. 22, 1949 |

FOREIGN PATENTS

| Number | Country | Date |
|---|---|---|
| 268,188 | Great Britain | Mar. 31, 1927 |
| 364,407 | Great Britain | Jan. 7, 1932 |
| 532,342 | Great Britain | Jan. 22, 1941 |

OTHER REFERENCES

Newman, "Industrial and Engineering Chemistry," vol. 40, No. 4, pp. 561–562 (1948).

Tucker, "Chemical and Metallurgical Engineering," vol. 51, No. 3, pp. 96–99, 108 (1944).

Bland, "Petroleum Processing," October 1947; pp. 731–733.